March 16, 1937.  E. BENEDEK  2,074,202
BEARING
Filed Nov. 4, 1932   5 Sheets-Sheet 1

Inventor
Elek Benedek
By
Attorney

Inventor
Elek Benedek

By

Attorney

March 16, 1937. E. BENEDEK 2,074,202
BEARING
Filed Nov. 4, 1932 5 Sheets-Sheet 4

Inventor
Elek Benedek
By
Attorney

March 16, 1937. E. BENEDEK 2,074,202

BEARING

Filed Nov. 4, 1932 5 Sheets-Sheet 5

Inventor
Elek Benedek

By
Attorney

Patented Mar. 16, 1937

2,074,202

UNITED STATES PATENT OFFICE 2,074,202

BEARING

Elek Benedek, Mount Gilead, Ohio

Application November 4, 1932, Serial No. 641,186

16 Claims. (Cl. 308—202)

This invention relates to bearings and more particularly to roller bearings of the type in which the length-diameter ratio of the individual roller elements is large, the individual elements being herein termed "needle rollers" because of their elongated shape.

In accordance with my invention hardened and ground needle rollers are assembled in such manner as to provide capillary clearance spaces between adjacent roller elements so as to permit the elements to roll individually without rubbing against each other in metal-to-metal contact or engagement. Capillary spaces are provided by employing needle rollers of such length-diameter ratio that when assembled with a small amount of circumferential clearance, adjacent needles and the associated races will cooperate to define long narrow interspaces acting in the well known manner of capillary tubes to draw in fluid lubricant. The capillary attraction provides, in a sense, forced feed lubrication preventing the needles from throwing the lubricant off due to centrifugal force. According to a further feature of the invention, the mechanical cage heretofore often employed for maintaining rolling bearing elements in parallelism, is eliminated. The needle rollers of my invention themselves cooperate with lubricant in the capillary spaces for maintaining the needle rollers parallel to each other without the use of a cage.

The needle rollers may be made by the centerless grinding method.

The needle roller bearing in accordance with my invention differs entirely in its function and structure from the sliding and anti-friction bearings as heretofore known. In respect to its structure, and without reference to the length-diameter ratio of the individual elements and the circumferential clearance therebetween, it is similar to a cageless roller bearing. Between hardened and ground bearing surfaces there is a plurality of elements with circular cross-section called the needle rollers. As distinguished from heretofore known anti-friction rollers, the needle rollers have a capillary diameter and their length is always many times greater than the length of the diameter of a needle. This length is, however, not arbitrary and it is the purpose of this invention to provide needles with certain specific ratio between length and diameter so that the length does not exceed such a length which is able to maintain full lubrication at all times between the needles sufficient to allow free individual rotation for each needle which is carrying the load at that instant. Needles proportioned according to this invention are self-lubricating by the capillary action of the capillary interspaces, formed by the needles and their coacting bearing members. Furthermore the specific length is so determined that the unit pressure on the loaded or, better to say, working needles is great enough to force the working needles to roll around their individual axis while the needles on the unloaded side of the bearing are revolved about the axis of the bearing along with the working needles due to the rotation of the working needles, the revolution of the assembly of needles being thereby at a speed which is only one-half of the speed of revolutions per minute of the rotating bearing member. Thus, by forcing the working needles to rotate, the idle needles will be driven and revolve as an asembly in unison with the working needles with a speed equal to approximately one-half of the revolutions of the rotating active bearing member.

The term "active bearing member" means a load transmitting rotating bearing element. The term "needle"—cylindrical or quasi-cylindrical—means an element which in combination with similar needles may form capillary spaces. The term "passive bearing member" means a stationary bearing member. Applicant knows that the application of full roller bearings and of sliding needles is not entirely new. Bearings of the full type are proposed in U. S. Patent No. 268,236. Bearings of the sliding needle type are proposed in U. S. Patent Reissue No. 18,080.

In the latter patent, the needles are made so long as to normally prevent by the friction between two needles the rolling about individual axis of the individual needles. By the braking effect of the needles, said Letters Patent discloses and proposes essentially a "sliding needle" bearing with lubricant maintained in a "closed" cylindrical space by splash lubrication. According to the present invention I provide a bearing structure in which, during the operation of the bearing, one group of the needles is rolling under load with the driving bearing member or race whereas the other group of needles is idle and is driven by the rolling needles. This operation of the needles is readily understood when it is remembered that there is no cage in the bearing and that the needles must maintain the right working relation in a whole by the assembly and self-adjustment. The total clearance according to the size of the needle bushing diameter ranges about one to two needles per bearing. Thus, there is some operative clearance between the needles but not too great to allow transverse disangement of the individual needles. In order to break up the friction between the individual needles and allow them as perfect rotation as possible to roll with the respective bearing speed, the length is cut short enough for that.

It is because of the novel assembly of rollers of high length-diameter ratio with capillary clearance spaces between them that permits the "needles" to roll that my bearing possesses novel and improved operating characteristics and load carrying capacity and it is because of this novel assembly that it is distinguishable over the bearings of the prior art. My bearing combines two desirable characteristics heretofore only present in distinct types of bearings; namely, capillary lubrication (plain or needle "slide" bearings), and anti-friction or rolling load transmission (conventional roller bearings). It can be adopted with great advantage to replace either of the above mentioned types of bearings due to its great load-carrying capacity which exceeds ten times the capacity of bearings hitherto known, in a much smaller space.

The lubrication by the capillary force in this design eliminates entirely friction between the needle rollers and provides a greater efficiency bearing than has been known previously. The capillary attraction binds the lubricant between the needles and maintains it in the peculiar triangular wedge-shaped form as an oil film. In reciprocating bearings where otherwise the lubrication is difficult and often impossible this type of bearing is very well adaptable such as in crankshafts, cylinder wrist-pins, and the like.

Due to the formation of the effective oil field and oil film throughout the entire length of the needles, in combination with the rolling of the working needles and the swimming of the idle needles in the clearance space of the unloaded side of the bearing, the friction coefficient is ideal and figures to be 0.004 which is one-tenth only of the friction in a well-lubricated plain sliding bearing. The elimination of the cage allows the widest possible application of this bearing in single radial, multi-row-radial, single ring axial thrust or multi-ring axial thrust bearings. The dimensions of needle bearings are smaller than that of any existing bearings due to the greater load capacity of it. Their application without cages saves space and weight.

More specific objects and advantages will appear from the following description of several illustrations of present invention which form a part of this specification.

Figs. 1 to 18 inclusive illustrate the application of the invention for radial load and continuous rotation only.

Figs. 19 to 25 illustrate the application of the invention for reciprocating thrust bearings between parallel or concentric reciprocating members such as is used in high pressure and high speed hydraulic machines, compressors and rotary pumps.

Figures 26, 27, 28, 29, 30, 31, 32, 33:
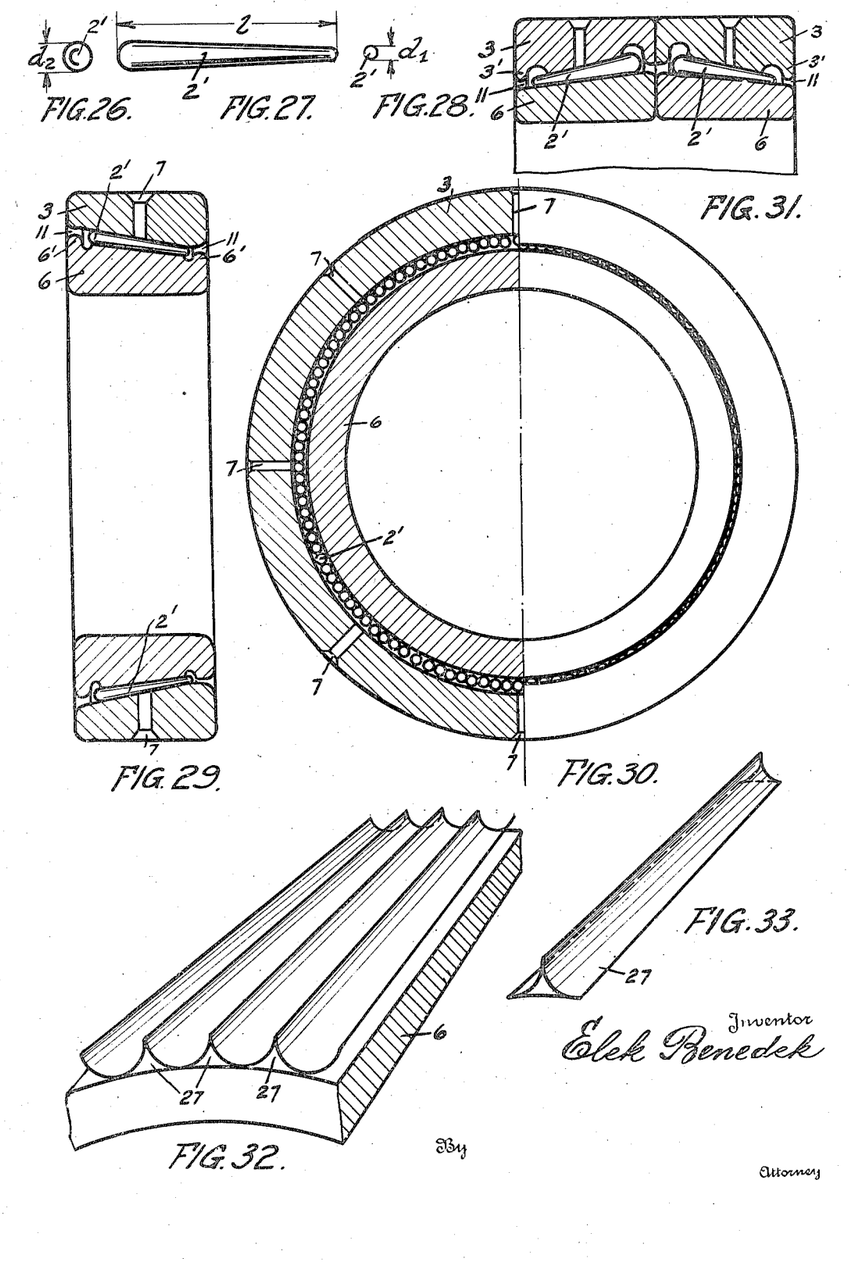
Fig. 26 is a view of Fig. 27.
Fig. 27 shows a needle roller with slightly tapered form.
Fig. 28 is a side view of the small end of the needle in Fig. 27.
Fig. 29 shows a complete bearing constructed with slightly tapered needles.
Fig. 30 is a partial sectional view of Fig. 29.
Fig. 31 shows a double row tapered needle bearing.
Fig. 32 shows an inner race alone with capillary interspaces shown after the needles are removed.
Fig. 33 is a tapered capillary interspace constructed after needles and races are removed.

Figs. 26 to 40 illustrate the application of the invention for rotary, continuous or reciprocating motion in axial thrust bearings such as in water turbines, propeller shafts and for shafts under combined radial and axial load (Figs. 29, 30 and 31).

The substance of the invention is the same in all of the above mentioned illustrative embodiments and it is in the provision of improved results by so constructing the bearings that:

1. A specific bearing pressure as high as 7000 pounds per square inch may be accommodated under all normal operation.

2. The maximum needle length will be below the capillary length wherein capillary length is the length of an oil column, which is maintained in a steel capillary tube against the gravitational force.

Figure 14:
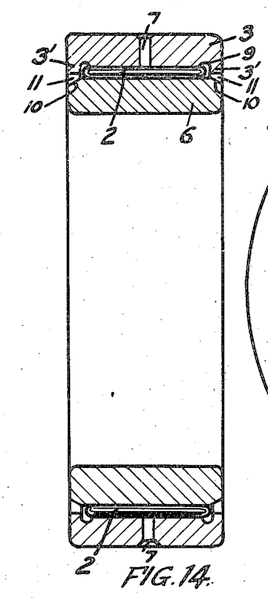
Fig. 14 is a complete needle bearing constructed in accordance with present invention.
Figure 15:
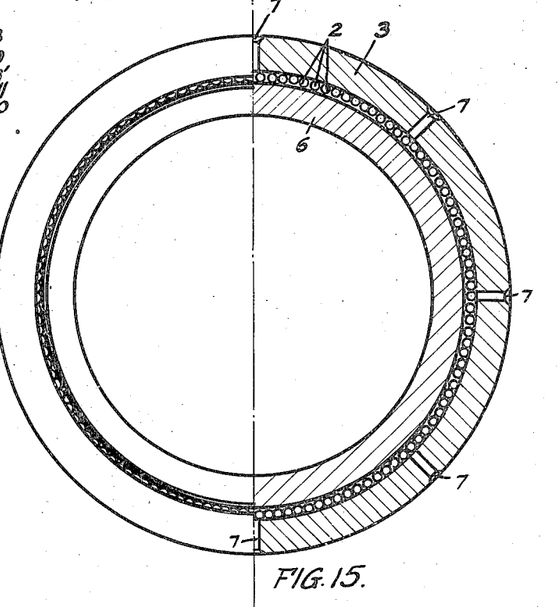
Fig. 15 is a sectional view of Fig. 14, taken at the vertical meridian of the bearing.
Figures 16, 18:
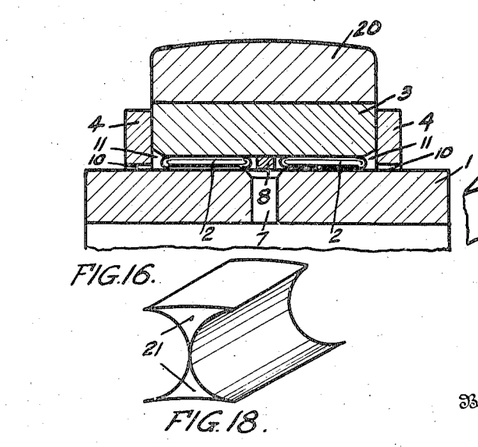
Fig. 16 shows the application of a double row bearing mounted on the wrist pin of a large Diesel engine.
Fig. 18 shows a portion of a capillary interspace formed by two needles and the cooperative bearing parts, in perspective engagement.
Figure 17:
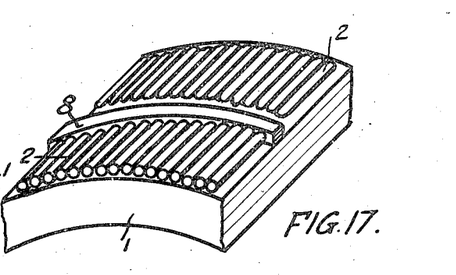
Fig. 17 is a perspective view of Fig. 16, with the outer bearing parts removed.
Figure 19:
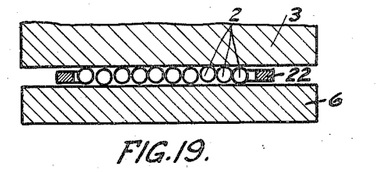
Fig. 19 shows a needle bearing of the reciprocating type.
Figure 20:
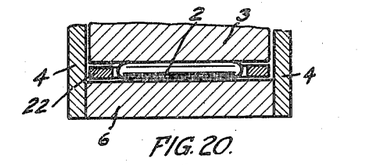
Fig. 20 is a vertical section of Fig. 19.
Figure 21:
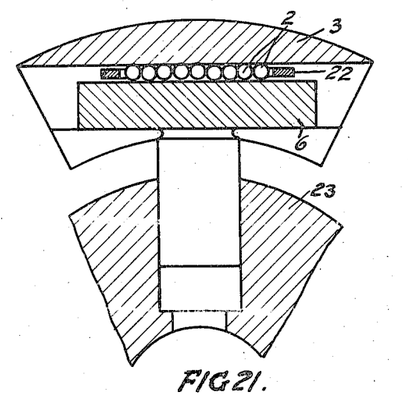
Fig. 21 shows an open bearing as supporting the reciprocating crosshead of a high pressure pump, taken through the center line of the pistons.
Figure 22:
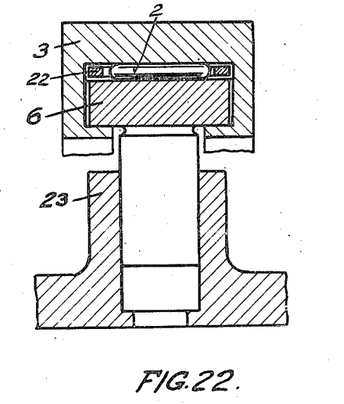
Fig. 22 is a transverse section of Fig. 21.
Figure 23:
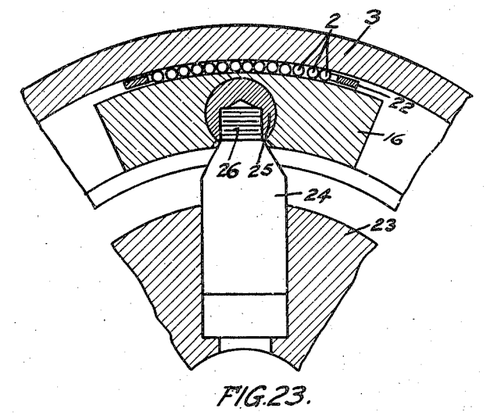
Fig. 23 is an open bearing used in a high pressure rotary pump, taken through the center line of the pistons.
Figure 24:
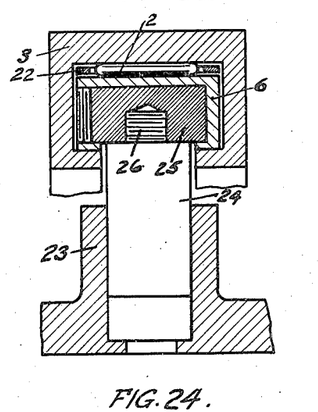
Fig. 24 is a transverse sectional view of Fig. 23.
Figure 25:
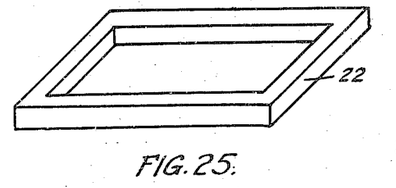
Fig. 25 is a needle retainer used in Figs. 19, 20, 21 and 22.

In order to accomplish the requirement under 1, for for instance in a bearing like in Fig. 14 the length of the needles is so determined that according to the designations of Figs. 12, 13, 14 and 15 the ratio between length and diameter is between a positive lower limit and a positive upper limit. Expressed in formula and in any linear scale—

$$5 \leq \frac{l}{d} \leq 10 \ldots \quad 1$$

Furthermore in regard to load-carrying capacity the unit load on the working bearing side as projected on the neutral bearing plane shall be about 7000 pounds per square inch mathematically with above designations:

$$1.D.k = 7000 \text{ lbs. per sq. in.} \ldots \quad 2$$

under all operating conditions, wherein $k$ is a factor characterized by the speed and is required for a maximum efficiency bearing. $k$ is called the load factor. For bearing materials known to me at the time of filing this application, the load factor $k$ has the following approximate mean values at various speeds:

| Speed in R. P. M. | Load factor in pounds per sq. in. | |
| --- | --- | --- |
| Incomplete | $k=4200$ lbs. per sq. in. | |
| 1–200 | $k=2800$ lbs. per sq. in. | |
| 200–1000 | $k=2100$ lbs. per sq. in. | |
| 1000–5000 | $k=1400$ lbs. per sq. in. | 3 |

In order to cut the friction between the individual needles to the possible minimum it is essential to keep the length of the needles below the capillary length and in harmony with the requirements expressed in Equations 1, 2, and 3.

Figure 1:
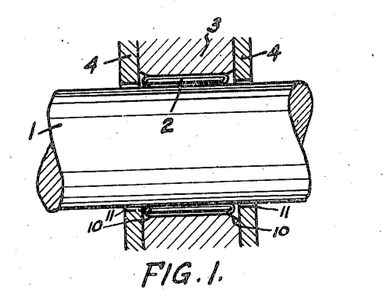
Fig. 1 shows a bearing structure constructed according to the present invention in a sectional view, wherein the shaft and the outer bearing member have plain bearing surfaces and the axial guiding of the needles is accomplished by two parallel plates.
Figure 2:
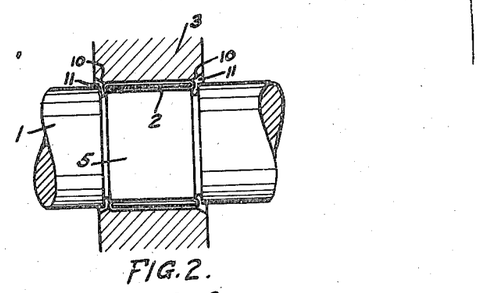
Fig. 2 is a bearing, similar to Fig. 1, except that the needles are mounted in recesses in the shaft and the outer race is plain.
Figure 3:
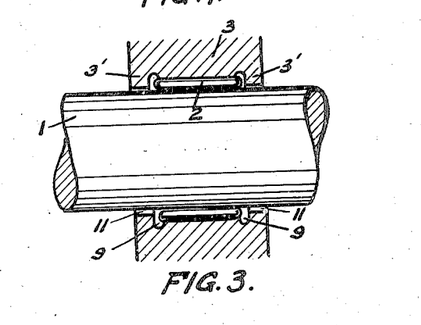
Fig. 3 is similar to Fig. 1 except that the needles are packed with intervening capillary clearance in the outer race which has shoulders.
Figure 4:
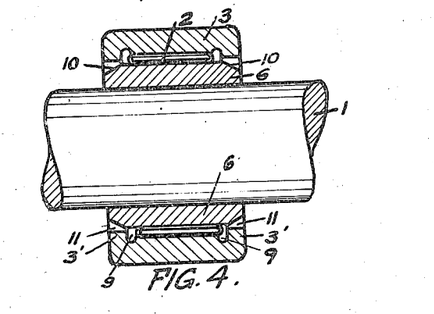
Fig. 4 shows a complete bearing with inner and outer races, mounted on a shaft.
Figures 5, 6, 7, 8, 9, 10, 11:
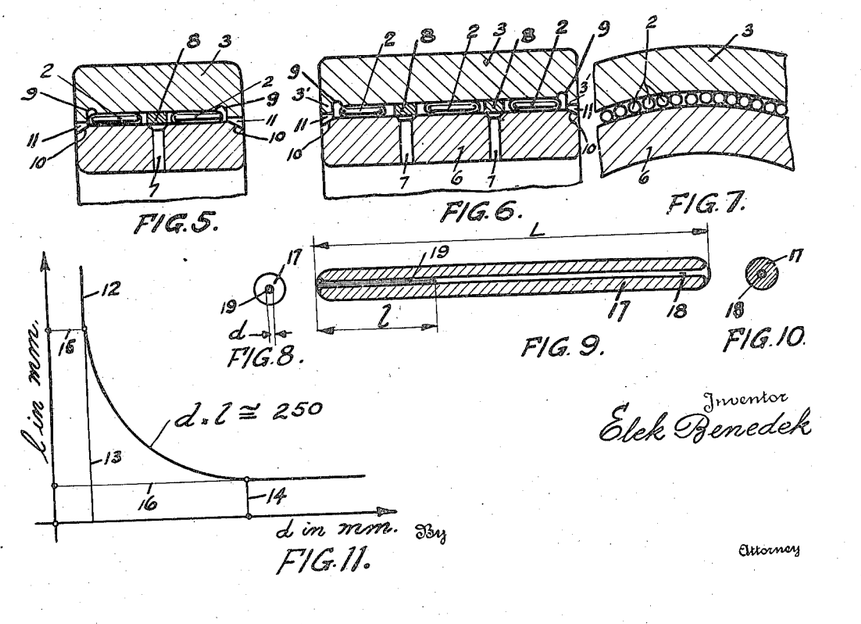
Fig. 5 is similar to Fig. 4 except that it shows a double row complete bearing.
Fig. 6 is similar to Fig. 5, except that it shows a triple row needle bearing.
Fig. 7 is a vertical sectional view of Figs. 5 and 6.
Fig. 8 is an end view of Fig. 9.
Fig. 9 is a central sectional view of a capillary tube containing fluid entrapped and kept therein by the capillary attraction.
Fig. 10 is an arbitrary transverse section of Fig. 9.
Fig. 11 is a diagram showing the capillary length of an oil column which can be maintained by the capillary force in the tube against the gravitational force, plotted against the diameter of the capillary tube as abscissa, and the length as ordinata.
Figure 12:
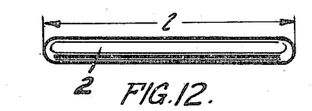
Fig. 12 is a needle constructed in accordance with present invention.
Figure 13:
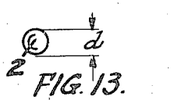
Fig. 13 is an end view of Fig. 12.

Fig. 11 shows that needles of any diameter have only one capillary length at which the capillary force furnishes and maintains complete lubrication. It is evident that the capillary interspaces have approximately the same cross-section as the needles. See Fig. 18. Bearings with needles longer than expressed by the diagram of Fig. 11 and its attached expression in millimeters:

$$d.1 = 250 \ldots \quad 4$$

will not and cannot maintain capillary forced lubrication at all times and they will burn out and overheat under load. It is well known that the combination of purely hardened bearing members under sliding relative motion is inoperative for the formation of oil film under the load carrying needles and is prohibitive due to the enormous line contact pressure. It is in the scope of this invention to eliminate overheating and seizure of the bearings by the design of a positive length for the needles which will roll at the most favorable speed under the load and will drive the idle needles so that the entire needle assembly will have combined rotary and individually rolling motion.

It is evident that in case of perfect rolling of the working needles, their rotary speed relative to the driving member (race) is exactly one half of the speed of the latter. Actually there is a slip between the rolling needles and the races which increases the relative rotary speed of the needles as a whole. The rolling slip of the needles varies with the speed and load of the bearings. At infinitely high speed and at small load the slip may become 100%.

*Bearing structure*

With reference to the figures, 1 is a driving member on which directly or indirectly a plurality of encircling needles 2 or 2¹ are mounted to form a continuous bearing surface. A direct acting passive member 3 and a direct acting active member 6 are spaced by the needles 2 and 2¹ respectively to maintain capillary interspaces 27 and 21 therebetween. Members 3 and 6 or 1 and 3 form a circular capillary space open at both ends as at 11. The rounded end needles (see Figs. 12 and 13) are axially secured by plates 4 or by the shoulders of a driving member 1 or shoulders 3¹ of passive member 3. Active members 6 or passive members 3 are chamfered as at 10 to open the needles to the capillary force of the capillary interspaces 27 (see Figures 32 and 33) and enable them to maintain perfect lubrication by the capillary attraction.

Shaft 1 may have a recess as at 5 (see Figure 2), to provide shoulders against the axial displacements of the needles in which case member 3 is provided with chamfers 10 and side clearance 11 for capillary lubrication. Member 3 is further provided with circular channels 9 (see Figure 3), to maintain a contacting oil supply for the capillary attraction of the bearing interspaces. In case the bearing load would require a needle length which would fall beyond the above limits of capillary lubrication, its length would be greater than the ordinate 13 in Fig. 11, the needles are cut and arranged on double or triple rows as in Figs. 5 and 6, carefully separated by rings 8.

Fig. 9 shows a capillary tube 17 with a capillary opening 18 in it which is holding fluid 19 by capillary attraction. When the tube is set in vertical position and against gravity the fluid column 1 will not drop out. The law of capillarity shown in Fig. 11 could be expressed in inches also, only the inch is not fit to express so conveniently the dimensions of a needle as the millimeter unit.

In case the active and passive bearing members in a machine cannot be hardened on account of their material or size a complete bearing as shown in Fig. 14 is provided to mount it in a well known manner. The complete bearing is provided with lubricating openings as at 7 and 11 and circular grooves 9 to maintain lubricant in readiness.

It is very seldom possible to provide a submerged bearing because of the very high speed. The passive bearing member must be drained so that churning up of oil and hydraulic friction losses are avoided.

It is very difficult to maintain lubricant in reciprocating bearings in high pressure pumps such as are illustrated in Figures 19 to 24. In such bearings either the lack of lubricant or the high specific pressure cause seizure and tremendous friction. If the bearing load is too high the oil will be squeezed out from the bearing parts and a sudden over-heating will thin the oil film so that the bearing will become inoperative or permit only very low specific bearing load. In order to overcome failure in heavy load machinery, provisions are made similar to present illustrations.

In this case the needles are packed loosely with intervening capillary clearance in a suitable retaining frame 22 to parallel the needles. The retaining frame, however, is not to be considered a cage such as used on caged bearings as it does not engage the individual rollers to constrain them to a fixed spaced relation in the direction of rotation. The spacing of the individual rollers is effected by the capillary oil films, the only effect of the frame being to limit the total clearance in the direction of rolling movement so that capillary films will be formed between the end rollers and the frame as well as between the individual rollers, thereby assuring maintenance of the proper spaced relation by the capillary films. These films, in effect, provide an elastic cage for the rollers. Bearings using such a frame, therefore, are also cageless. In such bearings very often there is a working cycle when all the needles carry load by rolling and an idle cycle when the needles will only swim. In above illustrations the machine parts such as crossheads 6 and 16 and a rotor 3 form the cooperating bearing. Members 23, 24, 25 and 26 are parts of the rotating cylinder and piston assembly.

Very often a radial load is combined with or accompanied by an axial load for which case the races 3 and 6 are formed conically such as shown in Fig. 29, with very slightly tapered needles such as in Figs. 26 and 27 and 28. The performance of the tapered needles is the same as that of the cylindrical needles previously described.

The capillary interspaces are shown in Figs. 32 and 33 as at 27. In multi-row arrangement as in Fig. 31 the load can be doubled without increasing the length of the capillary needles $2^1$. When the load is purely axial as in case of propeller shafts, large centrifugal pumps, turbines and the like, the slightly tapered needle bearing forms an unprecedented easy solution of the troubles which exist now in conventional bearings.

Such bearings as the Michel or Kingsbury bearings are complicated and perishable immediately if the supply of lubricant fails as is so common when pipes or pumps break by the vibration. For such applications a bell bearing as disclosed in Figs. 34, 35, 36 and 37 is a perfect remedy. If lubricant bath 33 fails and its level, for any reason, drops below the needles $2^1$, it may run for considerable length of time before damage occurs. The capillary fluid supply entrapped by the needles will prevent that; even if bushing 35 wears out and the bearing runs dry the circular rings 9 (Figure 36) will maintain lubrication for considerable length of time.

Figures 34, 35, 36, 37, 38, 39:
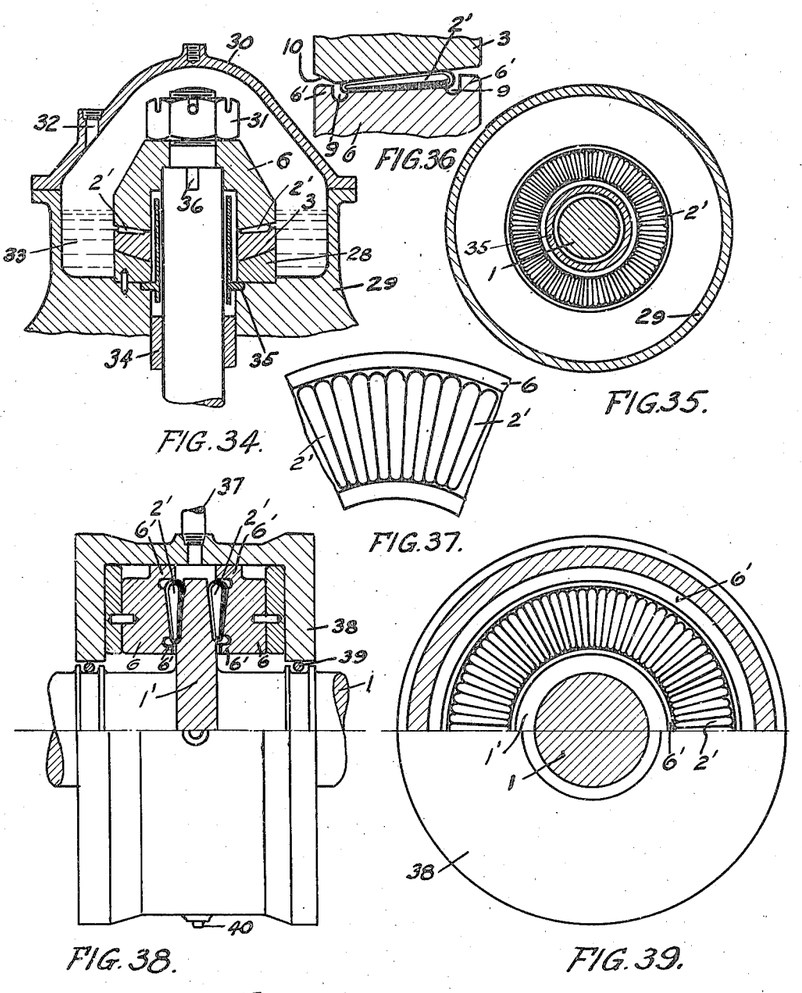
Fig. 34 shows the application of tapered needles in supporting the rotor of a water turbine.
Fig. 35 is a sectional view of Fig. 34 taken in a plane above the needles.
Fig. 36 is an enlarged portion of Fig. 34.
Fig. 37 is an enlarged portion of Fig. 35.
Fig. 38 shows a double row thrust needle bearing as it is applied to a propelling shaft in partial vertical sectional view.
Fig. 39 is a partial transverse sectional view of Fig. 38.
Figure 40:
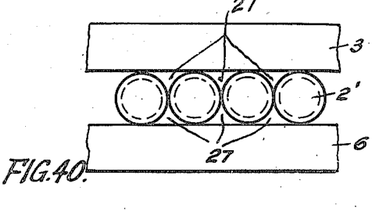
Fig. 40 shows the two sets of capillary interspaces in a thrust bearing.

Figs. 38 and 39 illustrate a propeller shaft 1 provided with thrust collar $1^1$, both faces of $1^1$ are packed with needles $2^1$ to provide forward and backward propulsion of the ship. Reaction members 6 are provided with circular shoulders $6^1$ to maintain circular rotation of the needles.

The needle bearing functions in a new way. In every bearing there is a total clearance of at least the space of one needle. The inner race 6 in Fig. 15 under the load assumes certain eccentricity in regard to the outer race 3. Therefore, it is evident that the needles at the smaller race clearance side are the ones which carry the load. Let these needles be the ones which are shown in section in Fig. 15 and be called the working needles. The working needles are rolling. The needles in the larger clearance side of the bearing races are out of contact with the races. The load action and the positive clearance, at least the space of one needle, cause that clearance. Therefore the needles located in the larger clearance half of the bearing which are unloaded and swimming and, though freely rotatable, they do not roll appreciably while in that particular portion of the bearing. Instead they are impelled along this portion of their path of travel by the loaded needles, the impelling force being transmitted through the medium of the fluid films so that the swimming needles travel at the same circumferential speed as the loaded needles, that is, at one half the speed of the driving race. The idle needles are then opposite to the working needles and consequently in Fig. 15 they are the needles which are shown in side elevation.

According to the spirit of the invention the working rollers are forced to roll between races. They are sufficiently loaded so that in the loaded zone they are forced to roll. However, when they are forced to roll individually the result is an absolute rotation of the entire needle assembly at one half of the angular or rotary speed of the driving race. Therefore, if the driving race rotates for example at 1000 revolutions per minute the absolute revolutions of the needle assembly as a whole will be 500 per minute only. In other words, speaking in relative motion, the needles in assembly will have 500 revolutions per minute relative to the inner and outer races or bearing members. There is thus formed by the needles a flexible sleeve-like bearing wherein the path of the needles is not a perfect circle owing to the eccentricity of the passive and active bearing members.

If the needles would fit tightly between their races as the anti-friction bearing rollers do, then all the needles would be forced to roll individually as the rollers of the anti-friction bearings with substantially rolling friction and heat development. If on the other hand, the needles were too long so that individual rolling were prevented by the braking effect of the needles themselves as it has been proposed in the prior art, all the needles would slide in their entirety and would have a speed substantially the same as the speed of the driving member. According to above example the needle bushing would slide with a relative velocity corresponding to 1,000 revolutions per minute. It is obvious that under load and with twice greater velocity the friction and heat developed by the sliding motion will be considerably more. In addition to that the sliding friction under load is ten times greater than the rolling friction under load. In fact, if at sliding load transmission the lubrication fails, the bearing will seize whereas the rolling load transmission will operate perfectly in present invention where there is clearance for an air film between the needles of relatively short length. In fact bearings constructed according to the substance of this invention are capable of operating without any lubrication because the working needles are rolling and the idle needles are revolving in unison in a clearance space on air film. Therefore, these bearings may be called "oilless needle bearings". However, between the working needles the lubricant eliminates the friction due to the opposed direction of rotation of adjacent surfaces of the needles so that the resultant friction coefficient in a rolling-sliding needle bearing figures 0.004 only.

Various changes may be made in either of the bearing structures hereinabove specifically described without departing from or sacrificing the advantages of the invention as defined in the appended claims.

I claim:

1. An anti-friction bearing means comprising a pair of relatively movable bearing members, a plurality of elongated cageless needle rollers of circular cross section interposed between the members for transmitting loads from one member to the other, the axes of said needle rollers extending transversely of the direction of relative movement of said members and being in rolling engagement with said members under normal load conditions, said needle rollers being very slightly spaced from each other in the direction of movement of the members to provide capillary interspaces for retaining capillary films of fluid between adjacent rollers, said films constraining the needle rollers to said spaced relation with respect to each other as the needle rollers roll on said members, whereby the needles may roll freely about their axes respectively substantially unrestrained by frictional engagement with each other.

2. An anti-friction bearing means comprising a pair of relatively movable bearing members, a plurality of elongated cageless needle rollers of circular cross section interposed between the members for transmitting loads from one member to the other, the axes of said needle rollers extending transversely of the direction of relative movement of said members and being in rolling engagement with said members under normal load conditions, said needle rollers being very slightly spaced from each other in the direction of movement of the members to provide capillary interspaces for retaining capillary films of fluid between adjacent rollers, and said needle rollers terminating endwise in inwardly spaced relation to the transverse limits of said members and having their ends free for providing spaces around the ends for retaining capillary fluid films entirely enclosing each individual needle roller, said capillary films constraining the needle rollers to substantially equal spaced relation with respect to each other.

3. In an apparatus having relatively rotatable inner and outer complementary bearing members of circular cross section spaced radially from each other, a plurality of elongated capillary cageless needle rollers interposed between said members for transmitting loads from one member to the other and having their axes disposed transversely of the path of relative rotation of the members, all of said rollers being spaced apart circumferentially of the members a capillary distance from each other for retaining capillary fluid films between adjacent rollers, said films constraining said rollers to spaced relation with respect to each other circumferentially of the members, whereby said rollers are unrestrained by adjacent rollers and are substantially freely rotatable about their respective axes.

4. In an apparatus having relatively rotatable inner and outer complementary bearing members of circular cross section spaced radially from each other, a plurality of elongated capillary cageless needle rollers interposed between said members for transmitting loads from one member to the other and having their axes disposed transversely of the path of relative rotation of the members, said rollers entirely surrounding the inner bearing member with a total circumferential clearance sufficient to provide only capillary clearances between each needle roller and the needle rollers adjacent thereto.

5. In an apparatus having relatively rotatable inner and outer complementary bearing members of circular cross section spaced radially from each other, a plurality of elongated capillary cageless needle rollers interposed between said members for transmitting loads from one member to the other and having their axes disposed transversely of the path of relative rotation of the members, said rollers entirely surrounding the inner bearing member with a total circumferential clearance of from one to three roller diameters, and said needles being free from each other whereby capillary fluid films may form between adjacent needles and adjust said needles to positions substantially equally spaced from each other and constrain the needles to said spaced relation.

6. In an apparatus having an inner bearing member and a complementary outer bearing member forming relatively rotatable substantially cylindrical bearing races, a plurality of capillary needle rollers interposed between said races in load transmitting relationship, said rollers being spaced apart from each other circumferentially of the races a capillary distance for retaining capillary fluid films therebetween, said films constraining the rollers to said spaced relation whereby each needle may roll freely substantially unrestrained by adjacent needles, and said races, when under load, having radial spacing at the instantaneous unloaded portion providing radial clearance between the races and the needle rollers to permit free revolution of the unloaded rollers by the loaded rollers, circumferentially of the races by force transmitted through the medium of the capillary films, whereby all the loaded rollers may roll freely under normal loads and the unloaded rollers, although free to roll, may be moved, substantially free from rotation about their respective axes, in the same direction.

7. In an apparatus having an inner bearing member and a complementary outer bearing member forming relatively rotatable substantially cylindrical bearing races, a plurality of capillary needle rollers interposed between said races in load transmitting relationship, said rollers being spaced apart from each other circumferentially of the races a capillary distance for retaining capillary fluid films therebetween, said films constraining the rollers to said spaced relation whereby each needle may roll freely substantially unrestrained by adjacent needles, and said races having radial spacing at the instantaneous unloaded portion providing capillary radial clearance between the races and the needle rollers to permit free travel of the unloaded rollers by the loaded rollers, circumferentially of the races by force transmitted through the medium of the capillary films, whereby all the loaded rollers may roll freely under normal loads and the unloaded rollers, although free to roll, may be moved, substantially free from rotation about their respective axes, in the same direction.

8. A bearing means comprising a pair of complementary spaced relatively movable races, a plurality of cageless capillary needle rollers in load transmitting relation therebetween, said needle rollers extending transversely of the direction of relative movement of the races, and having a total clearance in the direction of relative movement of the races sufficient to provide capillary fluid interspaces between each roller and adjacent rollers, for formation of a capillary fluid cage to constrain the rollers to spaced relation from each other.

9. A bearing means comprising a pair of complementary spaced relatively movable races, a plurality of cageless capillary needle rollers in load transmitting relation therebetween, said needle rollers extending transversely of the direction of relative movement of the races, and having a total clearance in the direction of relative movement of the races sufficient to provide capillary fluid interspaces between each roller and adjacent rollers, for formation of a capillary fluid cage to constrain the rollers to spaced relation from each other, and said rollers terminating short of the transverse limits of the races and being movable axially therebetween while yieldably constrained to position by the capillary fluid film.

10. A bearing means comprising spaced complementary bearing members movable with respect to each other, capillary cageless needle rollers interposed between the members in load transmitting relation, said rollers having capillary fluid clearance spaces therebetween in the direction of movement of the bearing members, for retaining fluid by capillarity between the rollers, the ratio of the length to the diameter of the rollers being between the limits 1/diameter is equal to or greater than 5 and is equal to or less than 10.

11. A bearing means comprising spaced complementary bearing members movable with respect to each other, a plurality of capillary needle rollers interposed between said members in load transmitting relationship, said rollers having their axes extending transversely of the direction of relative movement of the members and being spaced from each other in the direction of movement to form capillary fluid interspaces therebetween, and the length of each roller being sufficient to permit formation of fluid films by capillarity for the full length thereof.

12. A bearing means comprising relatively movable complementary bearing members, a plurality of sets of capillary needle rollers interposed between said members in load transmitting relationship, said rollers having their axes extending transversely of the direction of movement of the members and said rollers being spaced form each other in the direction of movement to form capillary fluid interspaces therebetween, the length of each roller being sufficient to permit formation of fluid films by capillarity for the full length of the roller, the rollers of each set being limited to said capillary lengths and said sets being spaced apart transversely of the direction of relative movement of the bearing members, and means for admitting fluid to the sets of rollers at points between the sets.

13. An anti-friction bearing means comprising a pair of relatively reciprocable bearing members, a plurality of elongated cageless needle rollers of circular cross section interposed between the members for transmitting loads from one member to the other, the axes of said needle rollers extending transversely of the direction of relative movement of said members and being in rolling engagement with said members under normal load conditions, said needle rollers being very slightly spaced from each other in the direction of movement of the members to provide capillary interspaces for retaining capillary films of fluid between adjacent rollers said films constraining the needle rollers to said spaced relation with respect to each other, as the needle rollers roll on said members, whereby the needles may roll freely about their axes respectively substantially unrestrained by frictional engagement with each other.

14. A bearing means comprising a pair of complementary spaced relatively reciprocable members, a plurality of cageless capillary needle rollers in load transmitting relation therebetween, said needle rollers extending transversely of the direction of relative movement of said reciprocable members, and having a total clearance in the direction of relative movement of said members sufficient to provide capillary fluid interspaces between each roller and adjacent rollers, for formation of a capillary fluid cage to constrain the rollers to spaced relation from each other.

15. An anti-friction bearing means comprising a pair of relatively rotatable bearing members, a plurality of elongated cageless tapered needle rollers of circular cross section interposed between the members for transmitting loads from one member to the other, the axes of said needle rollers extending transversely of the direction of relative movement of said members and being in rolling engagement with said members under normal load conditions, said needle rollers being very slightly spaced from each other in the direction of movement of the members to provide capillary interspaces for retaining capillary films of fluid between adjacent rollers, said films constraining the needle rollers to said spaced relation with respect to each other as the needle rollers roll on said members, whereby the needles may roll freely about their axes respectively substantially unrestrained by frictional engagement with each other.

16. A bearing means comprising a pair of complementary spaced relatively rotatable races, a plurality of cageless capillary tapered needle rollers in load transmitting relation therebetween, said needle rollers extending transversely of the direction of relative movement of the races, and having a total clearance in the direction of relative movement of the races sufficient to provide capillary fluid interspaces between each roller and adjacent rollers, for formation of a capillary fluid cage to constrain the rollers to spaced relation from each other.

ELEK BENEDEK.